United States Patent Office 3,402,020
Patented Sept. 17, 1968

3,402,020
PROCESS FOR THE MANUFACTURE OF ALKALI METAL BORIDES
Alfred Lipp, Heising, Germany, assignor to Elektroschmelzwerk Kempten G.m.b.H., Munich, Germany
No Drawing. Filed Dec. 1, 1965, Ser. No. 510,979
Claims priority, application Germany, Dec. 24, 1964, E 28,425
4 Claims. (Cl. 23—204)

The present invention relates to the production of alkali metal borides. More particularly, it relates to a method of producing alkali metal borides by reacting boron carbide with alkali metals at elevated temperatures in the presence of a nonoxidizing atmosphere.

Numerous efforts have been made in the past to produce alkali metal borides but with no success until 1963 when Moissen, after reducing $B_2O_3$ or fluoroborates with sodium or potassium, found in the acid-insoluble residues from 3 to 6% of sodium and potassium which he believed was present in the form of the corresponding alkali metal borides, $MB_6$. Previous to this time there was no unequivocal proof of the existence of the alkali metal borides.

Andrieux stated that during the electrolysis of lithium borate he obtained a mixture of boron and lithium hexaboride, $LiB_6$. Blum, however, stated that sodium was the only alkali metal which, on the basis of its ionic structure, could replace the other metals in hexaborides. All of the work and statements of these investigators were quite indefinite in character and inconclusive.

Markowskii undertook extensive investigations in connection with attempts to produce lithium boride, using a number of different methods including electrolysis of molten lithium borates, thermal reduction of mixtures of lithium oxide and boric anhydride with magnesium, reduction of boric anhydride with lithium, reaction of boron with lithium hydride and direct synthesis from lithium and boron. None of his experiments, however, gave a uniform product. His Debye-Scherrer X-ray diagrams were always those of boron, thus indicating that he never obtained a lithium boride.

It has now been discovered in accordance with the present invention that alkali metal borides, such as for example, the borides of sodium, potassium and lithium, can be satisfactorily produced by reacting boron carbide with an alkali metal, or hydride thereof, at temperatures ranging from about 500° to about 1400° C., and preferably, between 700° and 1000° C. in the presence of a nonoxidizing atmosphere. In carrying out the reaction it has been found desirable to have present in the reaction mixture at least 10%, and preferably 20 to 40% by weight of the alkali metal. The nonoxidizing atmosphere may consist of argon or hydrogen, or other gas which does not react with any of the constituents present under the conditions of the reaction. It has been noted, however, that the Debye-Scherrer X-ray diagrams of the alkali metal borides prepared in an atmosphere of hydrogen differed somewhat from those of similar alkali metal borides prepared under an atmosphere of argon. From this fact, it is suspected that the presence of hydrogen gives rise to side-reactions of some type.

After treatment of the reaction product from the above reaction with an inorganic acid such as dilute hydrochloric acid (1 part HCl to 5 parts water) the reaction products were found to give uniform analyses. The color of the alkali metal borides, formed as above described, has been found to vary somewhat. Lithium boride, for example, ranges from blackish-brown to light-brown and the ratio of lithium to boron ranges from 1:3.7 to 1:4.1. The density, measured by picnometer, ranged from 1.7 to 1.9 g./cm.$^{-3}$.

The alkali metal borides, because of their high boron assay, may be used as neutron absorbing materials and from their properties it is believed that they will find general utility in nuclear reactor technology. They are also useful as starting materials in various chemical reactions, as well as additives to solid propellants.

The specific examples given below are for the purpose of illustrating the new method of producing alkali metal borides of the present invention. It is evident that variations from the specific procedures described will be obvious to one skilled in the art. Any such variation, however, which does not depart from the scope of the basic disclosure made herein is intended to come within the limits of the appended claims.

EXAMPLE I

A homogeneous mixture of 60% by weight of finely ground boron carbide and 40% metallic lithium was heated for a period of one hour, under an atmosphere of argon, at a temperature of 750° C. in a combustion boat of sintered boron nitride. After cooling, the resulting reaction product was treated with a warm solution of 6% aqueous hydrochloric acid. This treatment gave a blackish-brown powder which upon heating in air detonated violently. Chemical analysis of the product showed that it consisted of 81.3% boron, 12.8% lithium and 5.9% carbon, which according to the X-ray diagram, is present as free graphite. The ratio Li:B was 1:4.06, thus indicating a lithium boride having the overall formula $LiB_4$. Table I below shows the Debye-Scherrer X-ray diagram of the above material.

TABLE I

| Angle of Reflection 2θ (Deg.) | Identity Period d (A.) | Intensity I (percent) |
|---|---|---|
| 12.32 | 7.191 | 100 |
| 20.89 | 4.254 | 54 |
| 21.51 | 4.136 | 20 |
| 24.87 | 3.582 | 62 |
| 39.66 | 2.274 | 8 |

EXAMPLE II

This experiment was carried out in a manner similar to that of Example I described above with the exception that a mixture of 80% finely divided boron carbide and 20% metallic lithium was heated for a period of two hours at 600° C. under an atmosphere of hydrogen. The reaction product was treated with 6% aqueous hydrochloric acid. The resulting product was a light brown powder having a ratio of lithium to boron of 1:3.75 and a picnometer density of 1.73 g./cm.$^{-3}$. The Debye-Scherrer X-ray diagram of the material, as shown in Table II below, was substantially identical with that shown in Table I, with the exception that the intensities differed somewhat.

TABLE II

| Angle of Reflection 2θ (Deg.) | Identity Period d (A.) | Intensity I (percent) |
|---|---|---|
| 12.31 | 7.202 | 100 |
| 21.05 | 4.222 | 58 |
| 21.98 | 4.047 | 6 |
| 24.80 | 3.593 | 76 |
| 39.58 | 2.278 | 10 |

What is claimed is:
1. Process for the production of alkali metal borides which comprises reacting alkali metals with boron carbide in the presence of a nonoxidizing atmosphere at a temperature ranging from 500° to 1400° C.
2. The process of claim 1, wherein the reaction mixture contains 10–40% by weight of alkali metal.
3. The process of claim 1, wherein the reaction temperature is of the order of 700°–1000° C.
4. The process of claim 1, wherein the reaction is effected in the presence of an inert gas selected from the group consisting of hydrogen and argon.

No references cited.

OSCAR R. VERTIZ, *Primary Examiner.*

H. S. MILLER, *Assistant Examiner.*